UNITED STATES PATENT OFFICE

2,507,985
PAINT REMOVER COMPOSITION

Lester E. Kuentzel, Wyandotte, Mich., assignor to Wyandotte Chemicals Corporation, Wyandotte, Mich., a corporation of Michigan No Drawing. Application November 1, 1945, Serial No. 626,174

1 Claim. (Cl. 252—143)

This invention relates to compositions for removing or stripping paint, varnish, enamel, lacquer and the like from surfaces of metal, wood, glass, fabrics or brushes. The prime objective of my invention is to provide a paint remover which has high stripping power, i. e. capable of loosening the coating in a minimum period of time. Rapid loosening of the paint, varnish, etc. from the surface to which it is applied, is of course, the most desirable property in a paint remover since it contributes not only to the reduction of time and labor required for stripping, but also to the general economy and efficiency of the remover in doing a given job.

Chlorinated aliphatic hydrocarbon solvents have heretofore been used and formulated to a considerable extent as ingredients of paint removers. I have made the discovery that in the case of certain particular aliphatic chlorinated hydrocarbon solvents, the presence of an acid greatly improves the stripping power of such solvents; and that most unexpectedly, the addition of a small amount of water to the acid and solvent imparts still greater stripping power.

Acids have not heretofore been regarded as possessing any paint stripping powers in and of themselves. Therefore, the presence of an acid in the particular solvents herein specified, is believed to function as a solvent activating catalyst, which results in the remarkably enhanced stripping power.

Additional objectives and advantages of my invention shall become apparent as the following description proceeds.

To the accomplishment of the foregoing and related ends, the following description sets forth in detail a method of procedure whereby those skilled in the art may be enabled readily to understand and practice the principle of my invention.

I have made the discovery that of the large number of chlorinated hydrocarbon solvents which have heretofore been employed in paint remover compositions, that only a few of them respond to the activating influence of acid, or of water and an acid. Thus, for example, closely chemically related chlorinated hydrocarbons, such as 1,1,2-trichlorethane and trichlorethylene give just the opposite results, the former being greatly enhanced by the addition of an acid and/or water in its stripping power, and the latter failing to show any improvement. Accordingly, after extensive examination and testing of a great many solvents, I have determined the following chlorinated aliphatic solvents to be those which have the unique property of responding to the activating influence of an acid and/or water in substantially enhancing their paint stripping ability:

Methylene chloride
Ethylene dichloride
1,1,2-trichlorethane
1,1,2,2-tetrachlorethane
Chloroform
Ethylene chlorhydrin The following acids are those capable of imparting an activating effect on the stripping power of the above chlorinated solvents:

Formic
Acetic
Propionic
Salicylic
Butyric
Carbolic
Picric
n-Propyl phosphoric
Nitric
Benzoic
Cinnamic The amount of water incorporated into the mixture selected from the above solvents, and acids has been found to be critical. The amount of water should be no greater than that which is capable of going into solution with the remaining ingredients of the mixture. In other words, the mixture will remain in a single phase. If more than this maximum amount of water is added, not only will an emulsion be formed (i. e. two phases), which on standing and storage tends to separate out into layers, but also the stripping power of the composition will be decreased. As a practical criterion, the amount of water present in the formulations of solvents and acids hereinabove specified is found to be in the range of 0.01 to 6.0% by weight of the total composition. Below this range of water content, the enhanced stripping power is not obtained and above this range the stripping power fails to show a proportionate increase. The range of acid present may be from 0.1% to 50% by weight of the total composition.

Additional ingredients such as a thickening agent, an evaporation retardant, a wetting agent and a blending agent may also be incorporated to advantage into the composition. As examples of a thickening agent, there can be mentioned methyl cellulose, corn starch, bentonite, ethyl cellulose and cellulose acetate. Paraffin wax makes an excellent solvent evaporation retardant. Wetting agents of the alkyl aryl sulfonate type have been found to be quite satisfactory in the formulation of compositions embodying the principle of my invention. Specifically, alkyl aryl sulfonate wetting agents are available on the market under the trade names of "Santomerse D" and "Wetsit Concentrated." "Santomerse D" is a substantially 99% dodecylbenzene sodium sulfonate. "Wetsit Concentrated" is a proprietary alkyl aryl sulfonate containing a minor proportion of terpenes and about 20% water content. The alkyl and aryl groups of such latter form of alkyl aryl sulfonate are not definitely known or publicized, such information being the private property of the manufacturer of such product. "Wetsit Concentrated" is particularly suitable since it contains approximately 20% water and thus serves as a convenient means for adding the water ingredient to the composition, making it unnececessary to add water separately as there is enough water in such wetting agent to satisfy the formulation requirements.

The blending agent should be a co-solvent (such as methyl alcohol) for the thickening agent and the chlorinated aliphatic hydrocarbon. In the case of methyl cellulose as a thickening agent, an amine such as disclosed in my previously filed application Serial No. 509,121, filed November 5, 1943, now U. S. Pat. No. 2,433,517, issued Dec. 30, 1947, or one of the aliphatic alcohols or ethers disclosed in my co-pending application filed November 1, 1945, Serial No. 626,172 will be found the most satisfactory.

Generally outlined, the paint remover compositions of my invention are combined or formulated by mixing together the chlorinated solvent, the thickening agent, the acid, the water, and the blending agent in the order named and at room temperature. Melted paraffin wax, if present, is incorporated directly after the solvent.

The remarkable ability of relatively small amounts of water and acid to enhance or accelerate the stripping power of the chlorinated solvent, is shown in the following table where methylene chloride alone, and methylene chloride containing water and salicylic acid (separately and jointly), was applied to U. S. Navy Aeronautical Specification test panels 72 and 75E as recited in Navy Aeronautic Specification C-113, Amendment-2; and United States Army Air Force Test panels Nos. 14105 and 14109, as recited in Army Air Force Specification No. 14119. The detailed description of these stripping test panels is set forth in my co-pending application Serial No. 509,121, filed November 5, 1943.

*Table I*

| Methylene Chloride, c. c. | Salicylic Acid, gms. | Water, c. c. | Stripping Power (time in seconds to completely loosen coating from panels) | | | |
|---|---|---|---|---|---|---|
| | | | 72 | 75E | 14105 | 14109 |
| 10 | | | 600 | [1] over 10,000 | [1] over 10,000 | [1] over 10,000 |
| 10 | | 0.01 | 120 | 1,200 | | |
| 10 | 0.1 | | 240 | 1,200 | 1,800 | 1,800 |
| 10 | 0.1 | 0.01 | 60 | 120 | 720 | 720 |
| 10 | 0.1 | 0.1 | | | 30 | 260 |

[1] Coating softened, but not loosened.

The following table shows the remarkable manner in which the addition of a small amount of acid (1% by volume, chlorinated solvent basis, in the examples given) and a small amount of water (0.5 to 2% by volume, chlorinated solvent basis, in the examples given) enhances the stripping power of the chlorinated hydrocarbon solvents. The acetic acid ingredient employed in the formulations of this table is in the form of 100% glacial acetic acid, and the formic acid is in the form of a 90% (by weight) formic acid-water solution.

*Table II*

| Formulation No. | Constituents (parts by volume) | Stripping Power (time in seconds required to loosen coating completely on test panels #14105 and #14109) | |
|---|---|---|---|
| | | 14105 | 14109 |
| 1116 | Methylene Chloride 10 and Acetic Acid 0.1 | 1,500 | |
| 1187 | Methylene Chloride 10, Acetic Acid 0.1 and Water 0.1 | 20 | 110 |
| 1164 | Methylene Chloride 10, Formic Acid 0.1 and Water 0.1 | 10 | 50 |
| 1381 | Ethylene Dichloride (alone) | | (over) 1,800 |
| 1396 | Ethylene Dichloride 10, Formic Acid 0.1 and water .05 | | 360 |
| 1391 | Ethylene Dicholride 10 and Formic Acid 0.1 | | 480 |
| 1384 | 1,1,2-Trichlorethane (alone) | | (over) 1,800 |
| 1394 | 1,1,2-Trichlorethane 10 and Formic Acid 0.1 | | 1,200 |
| 1399 | 1,1,2-Trichlorethane 10, Formic Acid 0.1 and Water .05 | | 900 |
| 1382 | 1,1,2,2-Tetrachlorethane (alone) | | (over) 1,800 |
| 1392 | 1,1,2,2-Tetrachlorethane 10 and Formic Acid 0.1 | | 1,200 |
| 1397 | 1,1,2,2-Tetrachlorethane 10, Formic Acid 0.1 and Water .05 | | 720 |
| 1385 | Chloroform (alone) | | (over) 1,800 |
| 1395 | Chloroform 10 and Formic Acid 0.1 | | 360 |
| 1400 | Chloroform 10, Formic Acid 0.1 and Water .05 | | 250 |

In the above table where the stripping power of the respective solvents alone is noted as "over 1800 seconds" or 30 minutes, the test panel was not completely stripped. That is to say the coating was merely softened or partially loosened. However, in the case of all the other figures given in Table II, the coating was completely loosened and ready to fall off the panel, in the time periods given.

As the following examples of formulations of ingredients further serve to illustrate my invention, these examples, however, not being intended as limitations of the scope of my invention:

Example 1

[Formulation No. 1151]

|  | Amount | Per Cent by Weight | Per Cent H₂O Content |
|---|---|---|---|
| Methylene Chloride | 100 cc | 86.52 |  |
| Paraffin | 1 g | 0.65 |  |
| Methyl Cellulose (4000 cps.) | 2 g | 1.30 |  |
| "Wetsit Concentrated" (20% H₂O) | 5 cc | 3.24 | 0.648 |
| Water | 1 cc | 0.65 |  |
| Formic Acid (90%) | 2 cc | 1.49 | 0.149 |
| Methyl Alcohol | 12 cc | 6.15 |  |
|  |  | 100.00 | 0.897 |

The foregoing constituents were combined by mixing together in the order given above at room temperature, with the exception of paraffin wax which was melted prior to introduction into the mixture. The resulting composition possesses thixotropic properties, i. e. is fluid when agitated and gelled and immobile when applied to the surface from which the coating is to be removed. It is amber in color and smooth in texture. The formulation of Example 1 completely loosened the coating in 10 seconds from U. S. Navy Aeronautical Specification test panels 70E, 72 and 75E; completely loosened the coating from U. S. Army Air Force test panels Nos. 14105 in 20 seconds and 14109 in 70 seconds.

Example 2

[Formulation No. 1205]

|  | Amount | Per Cent by Weight | Per Cent H₂O Content |
|---|---|---|---|
| Methylene Chloride | 100 cc | 87.80 |  |
| Paraffin | 1 g | 0.65 |  |
| Methyl Cellulose (400 cps.) | 1 g | 0.65 |  |
| "Wetsit Concentrated" (20% H₂O) | 5 cc | 3.29 | 0.658 |
| Formic Acid (90%) | 1 cc | 0.70 | 0.070 |
| Acetic Acid (Glacial) | 1 cc | 0.65 |  |
| Methyl Alcohol | 12 cc | 6.25 |  |
| "Patent Blue" Dye | 0.02 g | 0.01 |  |
|  |  | 100.00 | 0.728 |

The resulting composition of the above example is thixotropic, blue in color and smooth in texture. Its stripping power is illustrated by the following test results:

| Panel | Time in Seconds |
|---|---|
| 70E | 10 |
| 72 | 20 |
| 75E | 10 |
| 14105 | 80 |
| 14109 | 70 |

Example 3

[Formulation No. 1370]

|  | Amount | Per Cent by Weight | Per Cent H₂O Content |
|---|---|---|---|
| Ethylene Dichloride | 100 cc | 87.05 |  |
| Paraffin | 1 g | 0.69 |  |
| Methyl Cellulose (4000 cps.) | 1 g | 0.69 |  |
| "Wetsit Concentrated" (20% H₂O) | 5 cc | 3.48 | 0.696 |
| Acetic Acid (Glacial) | 1 cc | 0.76 |  |
| Formic Acid (90%) | 1 cc | 0.76 | 0.076 |
| Methyl Alcohol | 12 cc | 6.57 |  |
|  |  | 100.00 | 0.772 |

The above formulation is slightly viscous and amber in color. It completely loosened the coating from test panel No. 14109 in 40 seconds.

Example 4

[Formulation No. 1375]

|  | Amount | Per Cent by Weight | Per Cent H₂O Content |
|---|---|---|---|
| Tetrachlorethane (Technical) | 100 cc | 89.46 |  |
| Paraffin | 1 g | 0.56 |  |
| Methyl Cellulose (4000 cps.) | 1 g | 0.56 |  |
| "Wetsit Concentrated" (20% H₂O) | 5 cc | 2.82 | 0.564 |
| Acetic Acid (Glacial) | 1 cc | 0.62 |  |
| Formic Acid (90%) | 1 cc | 0.62 | 0.062 |
| Ethyl Alcohol | 12 cc | 5.36 |  |
|  |  | 100.00 | 0.626 |

The paint remover composition of this example is amber in color, slightly viscous, transparent and smooth in texture. It stripped the coating from test panel No. 14109 in 90 seconds.

Example 5

[Formulation No. 1374]

|  | Amount | Per Cent by Weight | Per Cent H₂O Content |
|---|---|---|---|
| 1,1,2-Trichlorethane | 100 cc | 88.53 |  |
| Paraffin | 1 g | 0.61 |  |
| Methyl Cellulose (4000 cps.) | 1 g | 0.61 |  |
| "Wetsit Concentrated" (20% H₂O) | 5 cc | 3.06 | 0.612 |
| Acetic Acid (Glacial) | 1 cc | 0.68 |  |
| Formic Acid (90%) | 1 cc | 0.68 | 0.068 |
| Methyl Alcohol | 12 cc | 5.83 |  |
|  |  | 100.00 | 0.680 |

The paint remover composition of the foregoing example is amber in color, slightly viscous, transparent and smooth in texture. It completely loosened the coating from test panel No. 14109 in 70 seconds.

Example 6

[Formulation No. 1377]

|  | Amount | Per Cent by Weight | Per Cent H₂O Content |
|---|---|---|---|
| Chloroform | 100 cc | 88.90 |  |
| Paraffin | 1 g | 0.59 |  |
| Methyl Cellulose (4000 cps.) | 1 g | 0.59 |  |
| "Wetsit Concentrated" (20% H₂O) | 5 cc | 2.97 | 0.594 |
| Acetic Acid (Glacial) | 1 cc | 0.66 |  |
| Formic Acid (90%) | 1 cc | 0.66 | 0.066 |
| Methyl Alcohol | 12 cc | 5.63 |  |
|  |  | 100.00 | 0.660 |

This formulation is amber in color, slightly viscous and transparent. The stripping test showed removal of coating from test panel No. 14109 in 40 seconds.

Example 7

[Formulation No. 1379]

|  | Amount | Per Cent by Weight | Per Cent H₂O Content |
|---|---|---|---|
| Ethylene Chlorhydrin | 100 cc | 86.64 |  |
| Paraffin | 1 g | 0.71 |  |
| Methyl Cellulose (4000 cps.) | 1 g | 0.71 |  |
| "Wetsit Concentrated" (20% H₂O) | 5 cc | 3.57 | 0.714 |
| Acetic Acid (Glacial) | 1 cc | 0.79 |  |
| Formic Acid (90%) | 1 cc | 0.79 | 0.079 |
| Methyl Alcohol | 12 cc | 6.79 |  |
|  |  | 100.00 | 0.793 |

The composition resulting from this formulation is amber in color, slightly viscous and transparent, showing a stripping power on test panel No. 14109 of 300 seconds.

The unpredictable and unexpected results of the present invention will become more readily apparent, when it is noted that a mixture of ethylene dichloride 10 parts and acetic acid 0.1 (by volume) stripped test panel No. 14109 in 8 minutes, whereas a comparable mixture of ethylene trichloride (trichlorethylene) 10 parts and acetic acid 0.1 part, required over 20 minutes to strip the same panel. Therefore, the catalytic or activating ability of the acid is quite selective and dependent upon the combination with the particular chlorinated aliphatic hydrocarbon solvents which I have herein disclosed and hereinafter claim as within the scope of my invention.

Equivalent modes of practicing my invention may be followed provided that they are within the scope and purview of the appended claim.

I, therefore, distinctly claim and particularly point out as my invention:

A paint remover composition consisting essentially of a solvent selected from the group consisting of methylene chloride, ethylene dichloride, 1,1,2 - trichlorethane, 1,1,2,2 - tetrachlorethane, chloroform and ethylene chlorhydrin; 0.1–50% by weight of a mixture of approximately equal parts of 90% concentration formic acid and 100% concentration acetic acid, and 0.01–6% by weight of water.

LESTER E. KUENTZEL.

REFERENCES CITED

The following references are of record in the file of this patent:

UNITED STATES PATENTS

| Number | Name | Date |
|---|---|---|
| 309,655 | Scott | Dec. 23, 1884 |
| 1,095,270 | Ellis | May 5, 1914 |
| 1,147,850 | Ellis | July 27, 1915 |
| 1,406,175 | Ellis | Feb. 14, 1922 |
| 1,918,224 | Wilson | July 11, 1933 |
| 1,974,744 | Klinkenstein | Sept. 25, 1934 |
| 1,993,096 | Hodges | Mar. 5, 1935 |
| 2,418,138 | Packer | Apr. 1, 1947 |

FOREIGN PATENTS

| Number | Country | Date |
|---|---|---|
| 485,857 | Great Britain | May 20, 1938 |

Certificate of Correction

Patent No. 2,507,985                                            May 16, 1950

LESTER E. KUENTZEL

It is hereby certified that error appears in the printed specification of the above numbered patent requiring correction as follows:

Column 6, Example 4, first column of the table, for "Ethyl Alcohol" read *Methyl Alcohol*;

and that the said Letters Patent should be read with this correction therein that the same may conform to the record of the case in the Patent Office.

Signed and sealed this 15th day of August, A. D. 1950.

[SEAL]

THOMAS F. MURPHY,
*Assistant Commissioner of Patents.*